United States Patent
Kim et al.

(10) Patent No.: US 9,637,576 B2
(45) Date of Patent: *May 2, 2017

(54) DEVICE AND METHOD FOR RE-CIRCULATING RAW MATERIAL USED WHEN MANUFACTURING POLYBUTENE

(71) Applicant: DAELIM INDUSTRIAL CO., LTD., Seoul (KR)

(72) Inventors: Myeong Seok Kim, Sejong (KR); Min Sup Park, Daejeon (KR); Kyoung Tae Min, Seoul (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/908,702

(22) PCT Filed: Jul. 29, 2014

(86) PCT No.: PCT/KR2014/006933
§ 371 (c)(1),
(2) Date: Jan. 29, 2016

(87) PCT Pub. No.: WO2015/016577
PCT Pub. Date: Feb. 5, 2015

(65) Prior Publication Data
US 2016/0176994 A1    Jun. 23, 2016

(30) Foreign Application Priority Data
Jul. 30, 2013 (KR) .................. 10-2013-0090023

(51) Int. Cl.
*C08F 2/00* (2006.01)
*B01J 19/00* (2006.01)
(Continued)

(52) U.S. Cl.
CPC ............. *C08F 110/08* (2013.01); *B01J 19/24* (2013.01); *C08F 6/02* (2013.01); *C08J 11/02* (2013.01); *B01J 2219/24* (2013.01)

(58) Field of Classification Search
CPC .. C08F 6/02; C08F 110/08; C08F 2/01; C08F 4/14; B01J 19/24; B01J 4/14; C08J 11/02
(Continued)

(56) References Cited

U.S. PATENT DOCUMENTS

| 4,605,808 A | 8/1986 | Samson |
| 5,068,490 A | 11/1991 | Eaton |

(Continued)

FOREIGN PATENT DOCUMENTS

| JP | 2002-220411 | 8/2002 |
| JP | 2002220411 A | 8/2002 |

(Continued)

OTHER PUBLICATIONS

PCT/ISA/237 for corresponding Korean patent application PCT/KR2014/006933 with English translation (PCT/IB/326) mailed Feb. 11, 2016.

(Continued)

*Primary Examiner* — William Cheung
(74) *Attorney, Agent, or Firm* — Nath, Goldberg & Meyer; Jerald L. Meyer; Tanya E. Harkins

(57) ABSTRACT

Disclosed are a device and a method for continuously polymerizing polybutene by removing halogen acid, which is included in a reaction raw material, by adsorbing the halogen acid using an adsorbent and then re-supplying the reaction raw material into a reactor. The device for re-circulating the raw material when manufacturing polybutene comprises a reactor, into which a catalyst and a reaction raw material (diluted with an inactive organic solvent) are supplied and polymerized to produce a reaction product; a (Continued)

neutralizing/washing tank for removing the catalyst from the reaction product and neutralizing the reaction product; a separation tank for separating the reaction product into organic compounds and water; a C4 distillation column for distilling an unreacted raw material and the inactive organic solvent from the organic compounds; and an impurity adsorption column for removing halogen acid from the distilled unreacted raw material and the inactive organic solvent using an adsorbent.

9 Claims, 1 Drawing Sheet

(51) Int. Cl.
    *C08F 110/08*      (2006.01)
    *C08F 6/02*      (2006.01)
    *C08J 11/02*      (2006.01)
    *B01J 19/24*      (2006.01)

(58) Field of Classification Search
    USPC .......................................... 526/68; 422/131
    See application file for complete search history.

(56) References Cited

U.S. PATENT DOCUMENTS

| | | |
|---|---|---|
| 5,191,044 A | 3/1993 | Rath et al. |
| 5,408,018 A | 4/1995 | Rath |
| 5,962,604 A | 10/1999 | Rath |
| 6,300,444 B1 | 10/2001 | Tokumoto et al. |
| 6,518,373 B1 | 2/2003 | Rath et al. |
| 7,037,999 B2 | 5/2006 | Baxter, Jr. et al. |
| 2009/0281360 A1* | 11/2009 | Knowles ............... B01J 8/20 585/12 |
| 2016/0176994 A1* | 6/2016 | Kim .................. C08F 6/02 526/68 |

FOREIGN PATENT DOCUMENTS

| | | |
|---|---|---|
| KR | 10-0152136 | 10/1998 |
| KR | 10-0154363 | 12/1998 |
| KR | 100154363 B1 | 12/1998 |
| KR | 100715165 B1 | 5/2007 |
| KR | 10-0787851 | 12/2007 |
| KR | 10-0851639 | 8/2008 |
| KR | 100851639 B1 | 8/2008 |

OTHER PUBLICATIONS

International Search Report for corresponding Korean patent application PCT/KR2014/006933 with English translation mailed Nov. 3, 2014.

\* cited by examiner

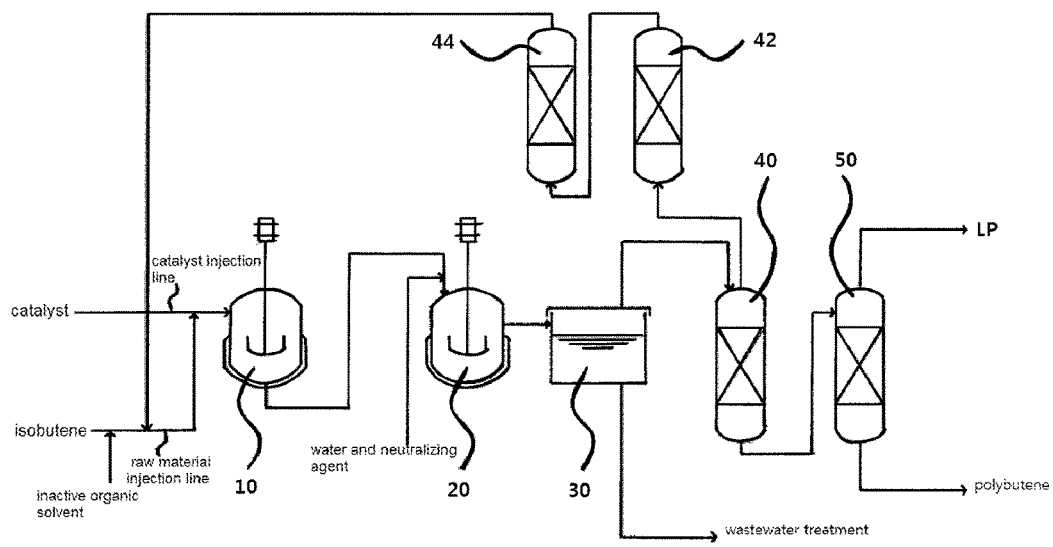

DEVICE AND METHOD FOR RE-CIRCULATING RAW MATERIAL USED WHEN MANUFACTURING POLYBUTENE

This application is a U.S. National Stage Application under 35 U.S.C. §371 of International Patent Application No. PCT/KR2014/006933, filed 29 Jul. 2014, which claims the benefit of priority to Korean Patent Application No. KR 10-2013-0090023, filed 30 Jul. 2013.

TECHNICAL FIELD

The present invention relates to a device for preparing polybutene by re-circulating a raw material in polybutene preparation and a method of re-circulating the raw material, and more particularly to a device of continuously preparing polybutene by adsorbing and removing halogen acid included in the raw material using an adsorbent and then re-feeding the raw material into a reactor, and a method of re-circulating the same.

BACKGROUND

In general, polybutene is prepared by polymerizing a C4 olefin ingredient generated in a decomposition process of naphtha using a Friedel-Crafts catalyst and has a number average molecular weight (Mn) of about 300 to 5,000. As a used raw material, there is C4 raffinate-1 which is a remainder after extraction of 1,3-butadiene from a C4 raw material. Such C4 raffinate-1 includes paraffins such as isobutene and normal butane and olefins such as 1-butene, 2-butene, and isobutene. Isobutene, one olefin ingredient of the C4 raffinate-1, is included in an amount of about 30 to 50% by weight and has highest reactivity. Accordingly, generated polybutene is mainly composed of isobutene units. In addition, polybutene can be polymerized using butane-butene fraction (B-B fraction) which is a C4 mixture generated in a crude oil refinement process. Further, polybutene can be polymerized using pure isobutene which can be diluted with a butane-based solvent.

Viscosity of polybutene increases with increase in molecular weight. For example, polybutene has a viscosity of approximately 4 to 40,000 centistokes (cSt) at 100° C. In addition, polybutene is thermally cracked at a temperature of 300° C. or higher without leaving remnants behind, and is highly soluble in a lubricant or a fuel since the polybutene has a branched alkyl structure. Therefore, the polybutene is often used as an anti-scuff agent or a viscosity index improver when added to car engine oil, and also used as a detergent when mixed with a fuel in internal combustion engines for automobiles.

Because polybutene is mainly used in gluing agents, adhesives or insulating oils, high reactivity polybutene has not been favored. In recent years, however, the demands for high reactivity polybutene have risen steadily with the increasing use of the polybutene having polar groups introduced to enhance reactivity as a fuel cleaner or a lubricant additive. Thus, non-reactive polybutene (generally called and referred to as "regular polybutene" in this specification as needed) is used in gluing agents, adhesives, insulating oils, etc., while high reactivity polybutene and midrange reactivity polybutene, capable of having polar groups introduced using reactivity, are mainly used in fuel cleaners or lubricant additives. Most widely used polybutene products produced by introducing polar groups into polybutene are, for example, polyisobutenyl succinic anhydrides (PIBSA) prepared by reacting the terminal double bond of high reactivity polybutene with maleic anhydride in a thermal process, and alkyl phenols (e.g., polybutenyl phenol, etc.) prepared by the Manich reaction of phenols and midrange reactivity polybutene. These polybutene products are advantageously considered as functional polymers. Most of the lubricant additives or fuel cleaners are prepared with the PIBSA used as an intermediate. As the double bonds of the polybutene used in the preparation of PIBSA are positioned towards the end of the polybutene, the PIBSA can be produced with higher yield. But, the yield of PIBSA possibly decreases due to steric hindrance and the resultant lower reactivity in the case that the double bonds are positioned towards the interior of the polybutene and that the more alkyl groups are attached to the double bonds as substituents.

The phenomenon that a double bond is generated at a terminal of a molecule and polymerization is terminated is contrary to a general chemical reaction theory. Accordingly, so as to prepare high reactivity polybutene and midrange reactivity polybutene which are seldom generated, catalyst selection and cocatalyst system constitution are most important, and many variables such as reaction temperature or catalyst intensity should be controlled.

Prior to the advent of high reactivity polybutene, regular polybutene, that is, non-reactive polybutene has been used in the preparation of PIBSA. For enhancing the reactivity of the non-reactive polybutene, polybutene is chlorinated with chlorine gas through a chlorination reaction and reacted with maleic anhydride to yield PIBSA. Then, amines are added to the PIBSA to complete the final product. However, this method is not desirable in the economic and environmental aspects, since it costs too much due to expensive equipment used to prevent the corrosion of the reactor and uses a large quantity of a base solution to neutralize the unreacted chlorine gas. In addition, when the final product prepared by adding amines to the PIBSA with the chlorine content raised through the chlorination reaction is used as a fuel additive or the like, it may cause some problems, including corrosion of the internal combustion engine such as automobile engines, etc. and emission of chlorine as an exhaust gas. Accordingly, an improvement has been made towards the method of preparing lubricant additives or fuel cleaners using high reactivity polybutene. Such an advance of using high reactivity polybutenes in the place of non-reactive polybutenes in the lubricant additives or fuel cleaners can be considered as a process improvement that eliminates one step of the reaction and as an eco-friendly method that excludes emission of the toxic chlorine ($Cl_2$) gas.

Non-reactive polybutene is variously used in adhesives, sealants, lubricant additives, insulating oil, etc. requiring chemical stability (non-reactive properties), thermal stability, water barrier properties, stickiness, adhesiveness, etc. Such high reactivity polybutene, midrange reactivity polybutene, and non-reactive polybutene are used according to use of each of thereof.

U.S. Pat. Nos. 4,605,808, 5,068,490, 5,191,044, 5,408,018, 5,962,604, and 6,300,444 disclose a preparation method for high reactivity polybutene that has a vinylidene content of at least 70%, more preferably at least 80%, using boron trifluoride or a complex compound of boron trifluoride in the presence of a cocatalyst, such as water, ether, alcohol, etc. U.S. Pat. No. 7,037,999 B2 describes a polybutene having a vinylidene content less than 70% and a tetra-substituted double bond content less than 10%, and its preparation method. Korean Patent No. 10-0787851 mentions the advantages of the tetra-substituted double bonds and an economically effective preparation method for polybutene and specifies a preparation method for midrange reactivity polybutene. In addition, U.S. Pat. No. 6,518,373, which suggests technology similar to the present invention, discloses a method of continuously discharging a reaction product through polymerization of isobutene which is diluted with an inactive organic solvent in the presence of boron trifluoride and a catalyst including at least one cocatalyst. Here, the solvent and isobutene, which is not converted, should be distilled and re-circulated to the polymerization reactor after separating the catalyst from or inactivating the catalyst in the discharged reaction product, followed by distillation. Here, halogen acid and impurities present in the solvent and the non-converted isobutene are removed by washing with water several times and drying. Accordingly, a raw material can be re-circulated and, at the same time, polybutene can be continuously prepared. However, so as to wash with water once or more, a tank for mixing all of the inactive organic solvent, the non-converted isobutene and water, and a settler for separating a water layer from an organic layer are required. Therefore, if the washing is performed several times, problems such as high investment costs, use of a large amount of water, etc. may occur.

TECHNICAL PROBLEM

Therefore, it is an object of the present invention to provide a device for re-circulating a raw material to a polymerization reactor in polybutene preparation by removing impurities from a raw material so as to continuously prepare polybutene and a method of re-circulating the raw material.

It is another object of the present invention to provide a device for increasing a polybutene production amount with a minimum amount of raw material (unit amount of raw material) by re-circulating the raw material and a method of increasing the polybutene production amount.

TECHNICAL SOLUTION

To achieve the objects of the present invention, there is provided a device for re-circulating a raw material in polybutene preparation, comprising: a reactor, into which a catalyst and a reaction raw material (diluted with an inactive organic solvent) are supplied and polymerized to produce a reaction product; a neutralizing/washing tank for removing the catalyst from the reaction product and neutralizing the reaction product; a separation tank for separating the reaction product into organic compounds and water; a C4 distillation column for distilling an unreacted raw material and the inactive organic solvent from the organic compounds; and an impurity adsorption column for removing halogen acid from the distilled unreacted raw material and the inactive organic solvent using an adsorbent.

Also, there is provided a method for re-circulating a raw material in polybutene preparation, comprising: producing a reaction product at a reactor, into which a catalyst and a reaction raw material diluted with an inactive organic solvent are supplied and polymerized therein; removing the catalyst from the reaction product and neutralizing the reaction product; separating the reaction product into organic compounds and water; distilling an unreacted raw material and the inactive organic solvent from the organic compounds, after heating the organic compounds; removing halogen acid from the distilled unreacted raw material and the inactive organic solvent using an adsorbent; and re-supplying the unreacted raw material and inactive organic solvent,—from which the halogen acid is removed, to the reactor.

EFFECT OF INVENTION

Through a device for re-circulating a raw material in polybutene preparation and a method for the same according to the present invention, the raw material is re-circulated and thus only a minimum amount of raw material is used in polybutene preparation, whereby production costs can be reduced through maximization of a production yield of polybutene. For example, the device for re-circulating a raw material and the method of re-circulating the same according to the present invention increases the production yield by about 20%, so that about 90,000 tons of polybutene is prepared from 100,000 tons of isobutene raw material, while with prior art, about 75,000 tons of polybutene is prepared from 100,000 tons of isobutene raw material. Therefore, product competitiveness in the world market can be increased, thereby causing revenue growth.

BRIEF DESCRIPTION OF THE DRAWINGS

The FIGURE schematically illustrates a device for re-circulating a raw material in polybutene preparation according to an embodiment of the present invention.

DETAILED DESCRIPTION OF THE INVENTION

A more detailed description of the invention will be made by reference to the attached drawings.

As shown in the FIGURE, a device for re-circulating a raw material in polybutene preparation according to the present invention includes (a) a reactor 10, (b) a neutralizing/washing tank 20, (c) a separation tank 30, (d) a C4 distillation column 40, and (e) an impurity adsorption column 42, and further includes a water removal column 44 and a light polymer (LP) distillation column 50.

The reactor 10 is supplied with a catalyst through a catalyst injection line and a raw material such as isobutene, which is diluted with an inactive organic solvent, through a raw material injection line, and in the reactor 10, the raw material is polymerized, thereby producing a reaction product. The reaction product 10 is discharged through a lower part of the reactor 10 and then is fed to the neutralizing/washing tank 20.

The catalyst comprises a main catalyst, a cocatalyst, and an auxiliary cocatalyst. Examples of the main catalyst include is a Lewis acid selected from the group consisting of boron trifluoride, boron trichloride, aluminum trichloride, and zinc chloride, examples of the cocatalyst includes water or an alcoholic compound, and the auxiliary cocatalyst includes an alkyl ether compound. A typical Friedel-Crafts catalyst may be used as the main catalyst without limitation. For example, a Lewis acid such as boron trifluoride, boron trichloride, aluminum trichloride, and zinc chloride may be used as the main catalyst, but use of the boron trifluoride having excellent activity to induce production of terminal vinylidene and favorable for commercial purposes is most preferred. The boron trifluoride is fed so that the content of the boron trifluoride is in a range of 0.05 to 1 parts by weight, preferably 0.1 to 1 parts by weight, more preferably 0.15 to 0.95 parts by weight, based on 100 parts by weight of isobutene.

The cocatalyst essential for reactions serves as a proton ($H^+$) donor for reaction initiation, and water or an alcohol compound having 1 to 4 carbon atoms may be used without limitation. Examples of the alcohol compound may include methanol, ethanol, propanol, isopropyl alcohol (isopropanol), butanol, isobutanol, etc.

In addition, the auxiliary cocatalyst serves to stabilize protons produced by the cocatalyst and to adjust reactivity, and an alkyl ether ($R_1$—O—$R_2$) having 2 to 10 carbon atoms may be used without limitation. Examples of the alkyl ether may include dimethyl ether, diethyl ether, dipropyl ether, isopropyl sec-butyl ether, sec-butyl ether, isoamyl ether, isopropyl isoamyl ether, sec-butyl isoamyl ether, etc.

Meanwhile, it is preferable that the catalyst is injected so that the product quality may be easily controlled. The catalyst may be injected as a complex which is a mixture the main catalyst, the cocatalyst, and the auxiliary cocatalyst, or alternatively, the main catalyst, the cocatalyst, and the auxiliary cocatalyst may be individually selectively injected.

The reaction raw material used to prepare the polybutene includes 10% by weight or more, preferably 25 to 70% by weight of isobutene. For example, pure isobutene diluted with an inactive organic solvent can be used. Examples of the inactive organic solvent include isobutane, normal butane, normal pentane, isopentane and hexanes. Among them, isobutane and normal butane are preferred since these have boiling point similar to that of isobutene so as to be easily re-circulated after distillation.

Next, water and neutralizing agent, which are fed through a transfer line between the reactor 10 and the neutralizing/washing tank 20, are added to the reaction product in (b) the neutralizing/washing tank 20, to remove the catalyst from the reaction product for the neutralization and remove impurities in the reaction product by washing. The reaction production after the catalyst removal and neutralization is discharged to a side of the neutralizing/washing tank 20 and is fed to (c) the separation tank 30.

The (c) separation tank 6 serves to separate the reaction product into organic compounds and water using the principle of layer separation. The water (waste water) including the catalyst which is washed in the neutralizing/washing tank 20 is discharged to a lower part of the separation tank 30, and organic compounds without the catalyst is discharged to an upper part of the separation tank 30.

In (d) the C4 distillation column 40, among the organic compounds fed from the separation tank 30, unreacted raw material such unreacted isobutene and the inactive organic solvent are distilled. The distilled raw material and inactive organic solvent are supplied to the impurity adsorption column 42 through the upper part of the C4 distillation column 40, and remaining organic compounds are discharged to a lower part of the C4 distillation column 40 and fed to the light polymer (LP) distillation column 50.

In (e) the impurity adsorption column 42, halogen acid included in the raw material unreacted, such as the distilled unreacted isobutene, and the inactive organic solvent from the C4 distillation column 40, is removed by an adsorbent filled in the impurity adsorption column 42, thereby the raw material is capable to be re-circulated. The unreacted raw material such as isobutene and the inactive organic solvent, which are free of the halogen acid, are discharged to an upper part of the impurity adsorption column 42 and supplied to the water removal column 44 or the raw material injection line, being an optional component. A halogen element in the halogen acid is included in a main catalyst such as boron trifluoride ($BF_3$), and the halogen acid is an HX type generated in a killing (inactivation) process of a catalyst after polymerization reaction. Examples of the halogen acid include hydrofluoric acid (HF) or hydrochloric acid (HCl), etc.

Examples of the adsorbent filled in the impurity adsorption column 42 include calcium hydroxide ($Ca(OH)_2$), calcium oxide (CaO), calcium carbonate ($CaCO_3$), calcium chloride ($CaCl_2$), potassium hydroxide (KOH), potassium carbonate ($K_2CO_3$), potassium bicarbonate ($KHCO_3$), potassium chloride (KCl), sodium hydroxide (NaOH), sodium carbonate ($Na_2CO_3$), sodium hydrogencarbonate ($NaHCO_3$), solid silicas, solid aluminas, an anion exchange resin having a resin to which an amine group is attached and a cation exchange resins having a resin to which a sulfo group is attached. Among them, it is preferred to use calcium hydroxide, calcium oxide, calcium carbonate, calcium chloride, solid silicas, solid aluminas, resins, and the like, which are insoluble in water, after adsorbing halogen ions ($X^-$), e.g., fluoride ions ($F^-$).

Size of particles of the adsorbent should be proper so as to be easily applied to a tubular fixed-bed reactor, in which the catalysts are fixed and a substance to be reacted flows out. The size (diameter) of the adsorbent particle is 0.1 to 100 mm, preferably 0.5 to 100 mm, more preferably 1 to 95 mm. When the diameter is less than 0.1 mm, i.e., when the particles are minute powder particles, it may be difficult to apply the adsorbent particle to the tubular fixed-bed reactor. When the diameter is greater than 100 mm, adsorption efficiency may be rapidly decreased. In addition, the adsorbent particles should be processed (molded) in a constant shape. For example, the adsorbent particles may be processed into a spherical shape, a cylindrical shape, a tablet shape, etc., and the spherical shape is most preferred. Of course, all catalyst types may be applied to a continuous stirred-tank reactor (CSTR), being a mixed flow reactor (MFR), however, a minute powder remains in the reactor, and thus, in this case, the reactor is not suitable.

As needed, the water removal column 44 may be further included. Water in the unreacted raw material, such as the unreacted isobutene, and the inactive organic solvent supplied from the impurity adsorption column 42, is removed in the water removal column 44. Then the unreacted raw material such as such as the unreacted isobutene and the inactive organic solvent which are free of water, are re-fed into the raw material injection line. In addition, in the LP distillation column 50, polybutene is obtained by distilling the light polymer (LP) in the remaining organic compounds from the C4 distillation column 40. The distilled light polymer (LP) is discharged to an upper part of the LP distillation column 50 and collected therein, and polybutene without the LP is transferred to a lower part of the LP distillation column 50 and stored in a product tank.

Hereinafter, the method for re-circulating a raw material in the polybutene preparation according to the present invention is described in detail with reference to the FIGURE. The FIGURE provided to describe the method only shows an embodiment and the present invention is not limited to this FIGURE.

A method for re-circulating a raw material in the polybutene preparation according to the present invention includes steps of producing a reaction product at a reactor, into which a catalyst and a reaction raw material diluted with an inactive organic solvent are supplied and polymerized; removing the catalyst from the reaction product and neutralizing the reaction product; separating the reaction product into organic compounds and water; distilling an unreacted raw material and the inactive organic solvent from the organic compounds, after heating the organic compounds; removing halogen acid from the distilled unreacted raw material and the inactive organic solvent using an adsorbent;

and re-supplying the unreacted raw material and inactive organic solvent,—from which the halogen acid is removed, to the reactor.

The method for re-circulating the raw material in the polybutene preparation is described in detail. The main catalyst, the cocatalyst, the auxiliary cocatalyst, and a raw material such as the isobutene which is diluted in the inactive organic solvent are supplied to the reactor 10 and are polymerized therein, thereby producing a reaction product. Wherein the molecular weight of the product and the content of vinylidene, and the like are determined by controlling reaction temperature, the intensity of catalyst, and an isobutene content after the reaction. Water and a neutralizing agent fed through the transfer line between the reactor 10 and the neutralizing/washing tank 20 are added to the reaction production discharged from the reactor 10. The catalyst is removed from the reaction product by washing, and then the neutralization is carried to remove impurities from the reaction product. The reaction product delivered to the separation tank 30 is separated into organic compounds and water (waste water) by a layer separation principle. Subsequently, water containing the catalyst is treated as waste water, and the organic compounds are discharged to the C4 distillation column 40. In the C4 distillation column 40, the organic compounds fed from the separation tank 30 is heated so that among the organic compounds, the unreacted raw material, such as unreacted isobutene, and an inactive organic solvent in the organic compounds are distilled. The distilled raw material and inactive organic solvent are transferred to the impurity adsorption column 42, and the remaining organic compounds are transferred to the light polymer (LP) distillation column 50. Next, in the impurity adsorption column 42, halogen acid included in the raw material, such as the distilled unreacted isobutene, and the inactive organic solvent, which are supplied through the C4 distillation column 40, are adsorbed and removed using an adsorbent filled in the impurity adsorption column 42, so as to re-circulate the raw material. The raw material, such as the unreacted isobutene, and the inactive organic solvent, which are free of the halogen acid, are re-supplied to the reactor via the water removal column 44 or the raw material injection line, continuously preparing polybutene.

As needed, waters contained in the raw material, such as the unreacted isobutene, and the inactive organic solvent, which are supplied from the impurity adsorption column 42, are removed in the water removal column 44, and then the raw material, such as the unreacted isobutene, and the inactive organic solvent, which are free of waters, are re-fed into the reactor via the raw material injection line, performing continuous polymerization. In addition, in the LP distillation column 50, light polymer (LP) present in the remaining organic compounds from the C4 distillation column 40 is distilled, followed by being discharged and collected. Polybutenes after removal of the LP are stored in the product tank.

Meanwhile, the polybutene is classified into high reactivity polybutene, midrange reactivity polybutene, and general polybutene (hereinafter referred to as non-reactive polybutene). In the high reactivity polybutene, the content of vinylidene at a molecular terminal is greater than 70%, preferably 71 to 99%, more preferably 75 to 95%, most preferably 80 to 95%. In the midrange reactivity polybutene, the content of vinylidene at a molecular terminal is 40 to 70%, preferably 41 to 69%, more preferably 45 to 65%. In the non-reactive polybutene, the content of vinylidene at a molecular terminal is less than 40%, preferably 1 to 39%, more preferably 5 to 35%. In addition, the reactive polybutene and the non-reactive polybutene prepared through polymerization generally have a number average molecular weight (Mn) of 300 to 5,000.

The high reactivity polybutene and the midrange reactivity polybutene may be polymerized under general reaction conditions. For example, it is economical to perform the polymerization at −40 to 20° C., preferably −35 to 10° C. under a pressure of 3 kg/cm$^2$ or more, preferably 3.5 to 10 kg/cm$^2$ for a retention time of 5 to 100 minutes, preferably 10 to 45 minutes such that the raw material is maintained in a liquid state. In addition, a conversion rate of the isobutene is 70% or more, preferably 80 to 95%, during polybutene polymerization.

The non-reactive polybutene may be polymerized under general reaction conditions. For example, it is economical to perform reaction such that the raw material is in a liquid state at −20 to 60° C., preferably −10 to 40° C. for a retention time of 5 to 100 minutes, preferably 10 to 45 minutes under a pressure of 3 kg/cm$^2$ or more, preferably 3.5 to 10 kg/cm$^2$. In addition, a conversion rate of the isobutene is 70% or more, preferably 90 to 95% during polybutene polymerization.

As described above, when polybutene is prepared according to the method of the present invention, isobutene, as a raw material, is re-circulated and thus continuous polymerization is performed. Accordingly, the raw material participating in initiating the first reaction is seldom lost. Since isobutene is broadly used as the raw material of, other than polybutene, methyl t-butyl ether (MTBE) for increasing an octane number of gasoline, t-butanol, as a chemical, and isoprene isobutene rubber (IIR) used in vehicle tires and rubber industries, and the like, the amount of the isobutene is insufficient. Therefore, production yield increase through the present invention has a great advantage in efficient use of an insufficient raw material.

Hereinafter, the present invention will be described in more detail with reference to the following Examples. The scope of the present invention is not limited to the following Examples and covers modifications of the technical spirit substantially equivalent thereto.

Example 1

Polymerization of High Reactivity Polybutene Having Molecular Weight of 2,300 when Raw Material is Re-Circulated Through Impurity Adsorption Column A complex catalyst including isopropanol (cocatalyst)/boron trifluoride (main catalyst) in a moral ratio of 1.5 and isobutene controlled in an amount of 50% by weight along with normal butane, as an inactive organic solvent, were injected into a reactor to perform polymerization while maintaining the temperature of the reactor at −27° C. The reactor was maintained under a pressure of 3 kg/cm$^2$ or more such that the raw material was maintained in a liquid state. An average retention time was 45 minutes, and the catalyst was fed such that the amount of boron trifluoride was 0.27 parts by weight based on 100 parts by weight of the isobutene. After 180 minutes, a reaction product discharged from the reactor was mixed with 5% by weight of a caustic soda solution, as a neutralizing agent, and then transferred to a neutralizing/washing tank, stopping polymerization and removing the catalyst. Subsequently, waste water without the catalyst was transferred to the separation tank and then discharged to a lower part of the separation tank and removed. The organic compounds, remaining after removal of the catalyst, in the reaction product, were spurted to an upper part of the separation tank and then fed into a C4 distillation column. The organic compounds fed to the C4 distillation column were heated to 100° C., and unreacted isobutene and normal butane among the organic compounds were distilled in a weight ratio of about 14:86 and transferred to an impurity adsorption column, which was filled with calcium hydroxide as an impurity adsorbent, through an upper part of the C4 distillation column Water in the unreacted isobutene and normal butane, which are free of halogen acid by in the impurity adsorption column, was removed in the water removal column and then re-supplied to the reactor through the raw material injection line. The organic compound remainders fed to an LP distillation column through a lower part of the C4 distillation column were heated at 230° C., 25 torr for retention time of 30 minutes. The LP was distillated, discharged and collected at an upper part of the LP distillation column High reactivity polybutene was discharged to a lower part of the LP distillation column and stored in the product tank. From 180 minutes after initiation of reaction, a production amount of the high reactivity polybutene was 951 g (yield=95.1%) based on 1 kg of injected pure isobutene. The molecular weight and polydispersity of the high reactivity polybutene were measured through gel permeation chromatography (GPC), and vinylidene in the high reactivity polybutene was analyzed using C13-NMR. As a result, the content of vinylidene was 87.5% (number average molecular weight (Mn)=2,370 and polydispersity (Pd)=1.81).

Example 2

Polymerization of High Reactivity Polybutene Having Molecular Weight of 1,000 when Raw Material is Re-Circulated Through Impurity Adsorption Column A complex catalyst including isopropanol/boron trifluoride in a moral ratio of 1.75 and isobutene controlled in an amount of 50% by weight along with normal butane, as an inactive organic solvent, were injected into a reactor to perform polymerization while maintaining the temperature of the reactor at −17° C. The reactor was maintained under a pressure of 3 kg/cm$^2$ or more such that the raw material was maintained in a liquid state, and an average retention time was 45 minutes. Polymerization to obtain a product was performed in the same manner as in Example 1, except a catalyst was fed such that the amount of boron trifluoride was 0.33 parts by weight based on 100 parts by weight of the isobutene, and unreacted isobutene and normal butane in an organic compound fed into a C4 distillation column were distilled in a weight ratio of about 12:88. From 180 minutes after initiation of reaction, a production amount of the high reactivity polybutene was 938 g (yield=93.8%) based on 1 kg of injected pure isobutene, and the content of vinylidene in the high reactivity polybutene was 89.2% (Mn=960 and Pd=1.31).

Example 3

Polymerization of High Reactivity Polybutene Having Molecular Weight of 750 when Raw Material is Re-Circulated Through Impurity Adsorption Column A complex catalyst including isopropanol/boron trifluoride in a molar ratio of 1.8 and isobutene controlled in an amount of 50% by weight using normal butane, as an inactive organic solvent, were injected into a reactor to perform polymerization, while maintaining the temperature of a reactor at −12° C. The reactor was maintained under a pressure of 3 kg/cm$^2$ or more such that the raw material was maintained in a liquid state, and an average retention time was 45 minutes. Polymerization to obtain a product was performed in the same manner as in Example 1, except that boron trifluoride was fed in an amount of 0.4 parts by weight based on 100 parts by weight of the isobutene, and unreacted isobutene and normal butane in organic compounds fed into a C4 distillation column were distilled into a weight ratio of about 12:88. From 180 minutes after initiation of reaction, a production amount of the high reactivity polybutene was 926 g (yield=92.6%) based on 1 kg of injected pure isobutene, and the content of vinylidene in the high reactivity polybutene was 88% (Mn=780 and Pd=1.24).

Comparative Example 1

Polymerization of High Reactivity Polybutene Having Molecular Weight of 2,300 when Raw Material is Re-Circulated without Application of Impurity Adsorption Column A complex catalyst including isopropanol/boron trifluoride in a molar ratio of 1.6 and isobutene controlled in an amount of 50% by weight using normal butane, as an inactive organic solvent, were injected into a reactor to perform polymerization, while maintaining the temperature of a reactor at −27° C. The reactor was maintained under a pressure of 3 kg/cm$^2$ or more such that the raw material was maintained in a liquid state, and an average retention time was 45 minutes. Polymerization to obtain a product was performed in the same manner as in Example 1, except that the catalyst was fed such that the amount of boron trifluoride was 0.27 parts by weight based on 100 parts by weight of the isobutene, and unreacted isobutene and normal butane in organic compounds fed into a C4 distillation column were distilled in a weight ratio of about 15:85 and then directly fed into a water removal column without passing through an impurity adsorption column. From 180 minutes after initiation of reaction, a production amount of the high reactivity polybutene was 949 g (yield=94.9%) based on 1 kg of injected pure isobutene, and the content of vinylidene in the high reactivity polybutene was 78.8% (Mn=2,320 and Pd=1.84).

Comparative Example 2

Polymerization of High Reactivity Polybutene Having Molecular Weight of 2,300 when Raw Material is not Re-Circulated A complex catalyst including isopropanol/boron trifluoride in a molar ratio of 1.6 and isobutene controlled in an amount of 50% by weight using normal butane, as an inactive organic solvent, were injected into a reactor to perform polymerization, while maintaining the temperature of a reactor at −27° C. The reactor was maintained under a pressure of 3 kg/cm$^2$ or more such that the raw material was maintained in a liquid state, and an average retention time was 45 minutes. Polymerization to obtain a product was performed in the same manner as in Example 1, except that the catalyst was fed such that the amount of boron trifluoride was 0.27 parts by weight based on 100 parts by weight of the isobutene, and unreacted isobutene and normal butane in organic compounds fed into a C4 distillation column were distilled in a weight ratio of about 14:86 and then collected without recirculation. From 180 minutes after initiation of reaction, production amount of the high reactivity polybutene was 722 g (yield=72.2%) based on 1 kg of injected pure isobutene, and the content of vinylidene in the high reactivity polybutene was 87.6% (Mn=2,370 and Pd=1.85).

Comparative Example 3

Polymerization of High Reactivity Polybutene Having Molecular Weight of 1,000 when Raw Material is Re-Circulated without Application of Impurity Adsorption Column A complex catalyst including isopropanol/boron trifluoride in a molar ratio of 1.6 and isobutene controlled in an amount of 50% by weight using normal butane, as an inactive organic solvent, were injected into a reactor to perform polymerization, while maintaining the temperature of a reactor at −17° C. The reactor was maintained under a pressure of 3 kg/cm$^2$ or more such that the raw material was maintained in a liquid state, and an average retention time was 45 minutes. Polymerization to obtain a product was performed in the same manner as in Example 1, except that the catalyst was fed such that the amount of boron trifluoride was 0.33 parts by weight based on 100 parts by weight of the isobutene, and unreacted isobutene and normal butane in organic compounds fed into a C4 distillation column were distilled in a weight ratio of about 12:88 and then directly fed into a water removal column without passing through an impurity adsorption column. From 180 minutes after initiation of reaction, a production amount of the high reactivity polybutene was 935 g (yield=93.5%) based on 1 kg of injected pure isobutene, and the content of vinylidene in the high reactivity polybutene was 79.7% (Mn=970 and Pd=1.3).

Comparative Example 4

Polymerization of High Reactivity Polybutene Having Molecular Weight of 1,000 when Raw Material is not Re-Circulated A complex catalyst including isopropanol/boron trifluoride in a molar ratio of 1.6 and isobutene controlled in an amount of 50% by weight using normal butane, as an inactive organic solvent, were injected into a reactor to perform polymerization while maintaining the temperature of a reactor at −17° C. The reactor was maintained under a pressure of 3 kg/cm$^2$ or more such that the raw material was maintained in a liquid state, and an average retention time was 45 minutes. Polymerization to obtain a product was performed in the same manner as in Example 1, except that the catalyst was fed such that the amount of boron trifluoride was 0.33 parts by weight based on 100 parts by weight of the isobutene, and unreacted isobutene and normal butane in organic compounds fed into a C4 distillation column were distilled in a weight ratio of about 12:88 and then collected without recirculation. From 180 minutes after initiation of reaction, production amount of the high reactivity polybutene was 714 g (yield=71.4%) based on 1 kg of injected pure isobutene, and the content of vinylidene in the high reactivity polybutene was 88.8% (Mn=970 and Pd=1.34).

Comparative Example 5

Polymerization of High Reactivity Polybutene Having Molecular Weight of 750 when Raw Material is Re-Circulated without Application of Impurity Adsorption Column A complex catalyst including isopropanol/boron trifluoride in a molar ratio of 1.6 and isobutene controlled in an amount of 50% by weight using normal butane, as an inactive organic solvent, were injected into a reactor to perform polymerization, while maintaining the temperature of a reactor at −12° C. The reactor was maintained under a pressure of 3 kg/cm$^2$ or more such that the raw material was maintained in a liquid state, and an average retention time was 45 minutes. Polymerization to obtain a product was performed in the same manner as in Example 1, except that the catalyst was fed such that the amount of boron trifluoride was 0.4 parts by weight based on 100 parts by weight of the isobutene, and unreacted isobutene and normal butane in organic compounds fed into a C4 distillation column were distilled in a weight ratio of about 12:88 and then directly fed into a water removal column without passing through an impurity adsorption column. From 180 minutes after initiation of reaction, a production amount of the high reactivity polybutene was 920 g (yield=92%) based on 1 kg of injected pure isobutene, and the content of vinylidene in the high reactivity polybutene was 79% (Mn=770 and Pd=1.23).

Comparative Example 6

Polymerization of High Reactivity Polybutene Having Molecular Weight of 750 when Raw Material is not Re-Circulated A complex catalyst including isopropanol/boron trifluoride in a molar ratio of 1.6 and isobutene controlled in an amount of 50% by weight using normal butane, as an inactive organic solvent, were injected into a reactor to perform polymerization, while maintaining the temperature of a reactor at −12° C. The reactor was maintained under a pressure of 3 kg/cm$^2$ or more such that the raw material was maintained in a liquid state, and an average retention time was 45 minutes. Polymerization to obtain a product was performed in the same manner as in Example 1, except that the catalyst was fed such that the amount of boron trifluoride was 0.4 parts by weight based on 100 parts by weight of the isobutene, and unreacted isobutene and normal butane in organic compounds fed into a C4 distillation column were distilled in a weight ratio of about 12:88 and then collected without recirculation. From 180 minutes after initiation of reaction, a production amount of the high reactivity polybutene was 705 g (yield=70.5%) based on 1 kg of injected pure isobutene, and the content of vinylidene in the high reactivity polybutene was 88.1% (Mn=760 and Pd=1.22).

Physical properties and reaction conditions of polybutene prepared according to each of Examples 1 to 3 and Comparative Examples 1 to 6 are summarized in Table 1 below.

TABLE 1

|  | Production amount (g) of polybutene per 1 kg of iso-butene/yield (%) | Catalyst use amount based on 100 parts by weight of the isobutene (parts by weight) | Reaction temperature (° C.) | Vinylidene content(%) | Mn (Pd) |
|---|---|---|---|---|---|
| Example 1 | 951/95.1 | 0.27 | −27 | 87.5 | 2370 (1.81) |
| Example 2 | 938/93.8 | 0.33 | −17 | 89.2 | 960 (1.31) |
| Example 3 | 926/92.6 | 0.4 | −12 | 88 | 780 (1.24) |
| Comparative Example 1 | 949/94.9 | 0.27 | −27 | 78.8 | 2320 (1.84) |
| Comparative Example 2 | 722/72.2 | 0.27 | −27 | 87.6 | 2370 (1.85) |
| Comparative Example 3 | 935/93.5 | 0.33 | −17 | 79.7 | 970 (1.3) |
| Comparative Example 4 | 714/71.4 | 0.33 | −17 | 88.8 | 970 (1.34) |
| Comparative Example 5 | 920/92 | 0.4 | −12 | 79 | 770 (1.23) |
| Comparative Example 6 | 705/70.5 | 0.4 | −12 | 88.1 | 760 (1.22) |

As shown in Table 1, when the method for re-circulating the unreacted isobutene of raw material and the inactive organic solvent into the reactor is used after removing the halogen acid by means of the impurity adsorption column (Examples 1 to 3), a polybutene production amount per unit weight of a raw material can be maximized and the content of vinylidene is increased, thus producing high quality polybutene. On the other hand, when the raw material is re-circulated without application of the impurity adsorption column (Comparative Examples 1, 3 and 5), polybutene production amount per a unit weight of a raw material is high, but the content of vinylidene is low. When the raw material is not re-circulated (Comparative Examples 2, 4 and 6), the content of vinylidene is high, but polybutene production amount per unit weight of a raw material is small. Accordingly, it can be confirmed that low-quality polybutene is prepared or a large amount of raw material is consumed, compared to Examples 1 to 3 in which the impurity adsorption column is used.

The invention claimed is:

1. A device for re-circulating a raw material in polybutene preparation, comprising:
   a reactor, into which a catalyst and a reaction raw material (diluted with an inactive organic solvent) are supplied and polymerized to produce a reaction product;
   a neutralizing/washing tank for removing the catalyst from the reaction product and neutralizing the reaction product;
   a separation tank for separating the reaction product into organic compounds and water;
   a C4 distillation column for distilling an unreacted raw material and the inactive organic solvent from the organic compounds; and
   an impurity adsorption column for removing halogen acid from the distilled unreacted raw material and the inactive organic solvent using an adsorbent.

2. The device according to claim 1, wherein the adsorbent is selected from the group consisting of calcium hydroxide, calcium oxide, calcium carbonate, calcium chloride, potassium hydroxide, potassium carbonate, potassium bicarbonate, potassium chloride, sodium hydroxide, sodium carbonate, sodium hydrogen carbonate, solid silicas, solid aluminas, an anion exchange resin having a resin to which an amine group is attached and a cation exchange resins having a resin to which a sulfo group is attached.

3. The device according to claim 1, wherein a diameter of the adsorbent particle is 0.1 to 100 mm.

4. The device according to claim 1, wherein the catalyst comprises a main catalyst, a cocatalyst, and an auxiliary cocatalyst, wherein the main catalyst is a Lewis acid selected from the group consisting of boron trifluoride, boron trichloride, aluminum trichloride, and zinc chloride, the cocatalyst is water or an alcoholic compound, and the assistant cocatalyst is an alkyl ether compound.

5. The device according to claim 4, wherein the alcoholic compound is selected from the group consisting of methanol, ethanol, propanol, isopropyl alcohol (isopropanol), butanol, and isobutanol, and the alkyl ether compound is selected from the group consisting of dimethyl ether, diethyl ether, dipropyl ether, isopropyl sec-butyl ether, sec-butyl ether, isoamyl ether, isopropyl isoamyl ether, and sec-butyl isoamyl ether.

6. The device according to claim 4, wherein a content of the boron trifluoride is 0.05 to 1 part by weight with respect to 100 parts by weight of the isobutene.

7. Method for re-circulating a raw material in polybutene preparation, comprising:
   producing a reaction product at a reactor, into which a catalyst and a reaction raw material diluted with an inactive organic solvent are supplied and polymerized therein;
   removing the catalyst from the reaction product and neutralizing the reaction product;
   separating the reaction product into organic compounds and water;
   distilling an unreacted raw material and the inactive organic solvent from the organic compounds, after heating the organic compounds;
   removing halogen acid from the distilled unreacted raw material and the inactive organic solvent using an adsorbent; and
   re-supplying the unreacted raw material and inactive organic solvent,—from which the halogen acid is removed, to the reactor.

8. The method according to claim 7, wherein the polybutene is high reactivity polybutene, midrange reactivity polybutene, and non-reactive polybutene.

9. The method according to claim 8, wherein the high reactivity polybutene is polymerized at a temperature of −40 to 20° C. and a pressure of 3 kg/cm$^2$ or more for a retention time of 5 to 100 minutes.

* * * * *